United States Patent [19]
Mori

[11] Patent Number: 6,070,000
[45] Date of Patent: May 30, 2000

[54] PRINTING DEVICE

[75] Inventor: Hiromi Mori, Nagoya, Japan

[73] Assignee: Brother Kogyo Kabushiki Kaisha, Nagoya, Japan

[21] Appl. No.: 08/984,027

[22] Filed: Dec. 3, 1997

[30]     Foreign Application Priority Data

Dec. 5, 1996 [JP] Japan .................................... 8-325474

[51] Int. Cl.[7] .................................................. G06F 15/00
[52] U.S. Cl. .......................................... 395/114; 358/407
[58] Field of Search .................................... 395/101, 111, 395/112, 113, 114, 672, 673, 527, 200.3, 200.31, 200.35, 200.39, 200.48, 200.69; 358/501, 530, 400, 401, 407, 408, 435, 436, 448; 345/124, 128; 399/1, 8, 76, 91, 130, 150

[56]                References Cited

U.S. PATENT DOCUMENTS

| 5,140,674 | 8/1992 | Anderson et al. ...................... 395/111 |
| 5,228,118 | 7/1993 | Sasaki ..................................... 395/112 |
| 5,555,543 | 9/1996 | Yank ................................... 395/200.39 |
| 5,577,172 | 11/1996 | Vatland et al. ......................... 395/114 |
| 5,699,493 | 12/1997 | Davidson, Jr. et al. ................ 395/114 |

*Primary Examiner*—David K. Moore
*Assistant Examiner*—Gabriel I. Garcia
*Attorney, Agent, or Firm*—Oliff & Berridge, PLC

[57]           ABSTRACT

A plurality of personal computers 12 and a first printer 20 is connected to the LAN circuit 10. A plurality of printers 20a–20x is connected to the first printer 20 in a series. If it is possible, the printer 20 prints received printing data. However, if it is not possible, the printing data is transmitted to the second printer 20a. Therefore, if at least one of the printers 20–20x is in the available condition for printing, the printing data can be printed. That is, even if the printer 20 cannot perform the printing operation, overall printing work will not be backed up.

24 Claims, 5 Drawing Sheets

PRINTING DEVICE

BACKGROUND OF THE INVENTION

1. Field of the Invention

The present invention relates to a printing device.

2. Description of Related Art

There has been known printing devices including a data receiving unit for receiving data from devices upstream, a printing unit for printing according to the received data, and monitoring unit for determining whether or not the printing unit is in an available condition for printing operations. Such printing devices include printers and facsimile devices.

In a local area network (LAN), for example, a plurality of computers share a single printer. With this configuration, however, overall printing work is backed up when the printer cannot perform printing operations due to out of paper or any other errors. Also, when a facsimile device cannot perform printing operations because of, for example, out of paper, the facsimile device responds to incoming calls with a busy signal without receiving incoming data. This inconveniences both a transmitter and a receiver.

That is, overall work operations can be delayed simply because one printing device is unable to print.

SUMMARY OF THE INVENTION

In view of the problems described above, it is an object of the present invention to provide a printing device that will not delay printing work even if the device itself is unable to print.

To achieve the above and other objects, there is provided a local area network including a LAN circuit, a printing data generating device, and a plurality of printing. The printing data generating device generates printing data and is connected to the LAN circuit. The plurality of printing devices are connected in cascade and consecutively numbered from 1 to n where n is an integer. The LAN circuit connects the printing data generating device to the first printing device. Each of the plurality of printing devices includes first communication means for receiving the printing data, memory means for storing the printing data received by the first communication means, second communication means for outputting the printing data stored in the memory means, printing means for printing images based on the printing data received by the first communication means, and determining means for determining a state of the printing means whether or not the printing means is in an available condition for printing. The first communication means of an (i+1)th printing device is connected to and communicates with the second communication means of an i-th printing device. The first communication means of the first printing device is connected to and communicates with the printing data generating device. If the printing means of the i-th printing device is unavailable, the second communication means of the i-th printing device transmits the printing data to the first communication means of an (i+1)th printing device. i represents any one of integers from 1 to n.

There is also provided a printing system including a LAN circuit, a printing data generating device, and a plurality of printing. The printing data generating device generates printing data and is connected to the LAN circuit. The plurality of printing devices are connected in cascade and consecutively numbered from 1 to n where n is an integer. The LAN circuit connects the printing data generating device to the first printing device. Each of the plurality of printing devices includes first communication means for receiving the printing data, memory means for storing the printing data received by the first communication means, second communication means for outputting the printing data stored in the memory means, printing means for printing images based on the printing data received by the first communication means, and determining means for determining a state of the printing means whether or not the printing means is in an available condition for printing. The first communication means of an (i+1)th printing device is connected to and communicates with the second communication means of an i-th printing device. The first communication means of the first printing device is connected to and communicates with the printing data generating device. If the printing means of the i-th printing device is unavailable, the second communication means of the i-th printing device transmits the printing data to the first communication means of an (i+1)th printing device. i represents any one of integers from 1 to n.

DETAILED DESCRIPTION OF THE PREFERRED EMBODIMENT

A printing device according to a preferred embodiment of the present invention will be described while referring to the accompanying drawings.

DETAILED DESCRIPTION OF THE PREFERRED EMBODIMENT

A printing device according to a preferred embodiment of the present invention will be described while referring to the accompanying drawings.

Figure 1:
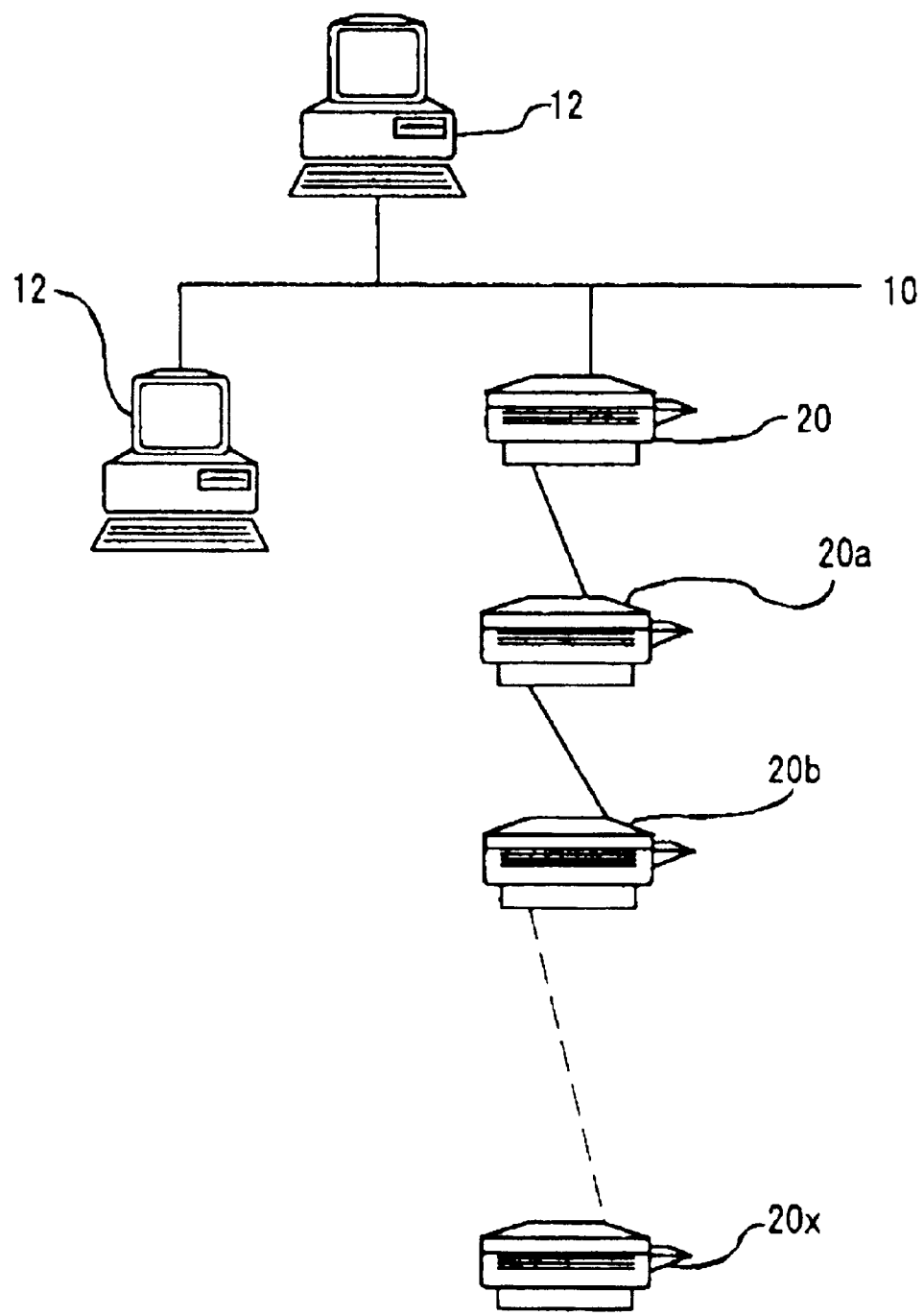
FIG. 1 shows a configuration of a LAN system according to an embodiment of the present invention.
Figure 2:
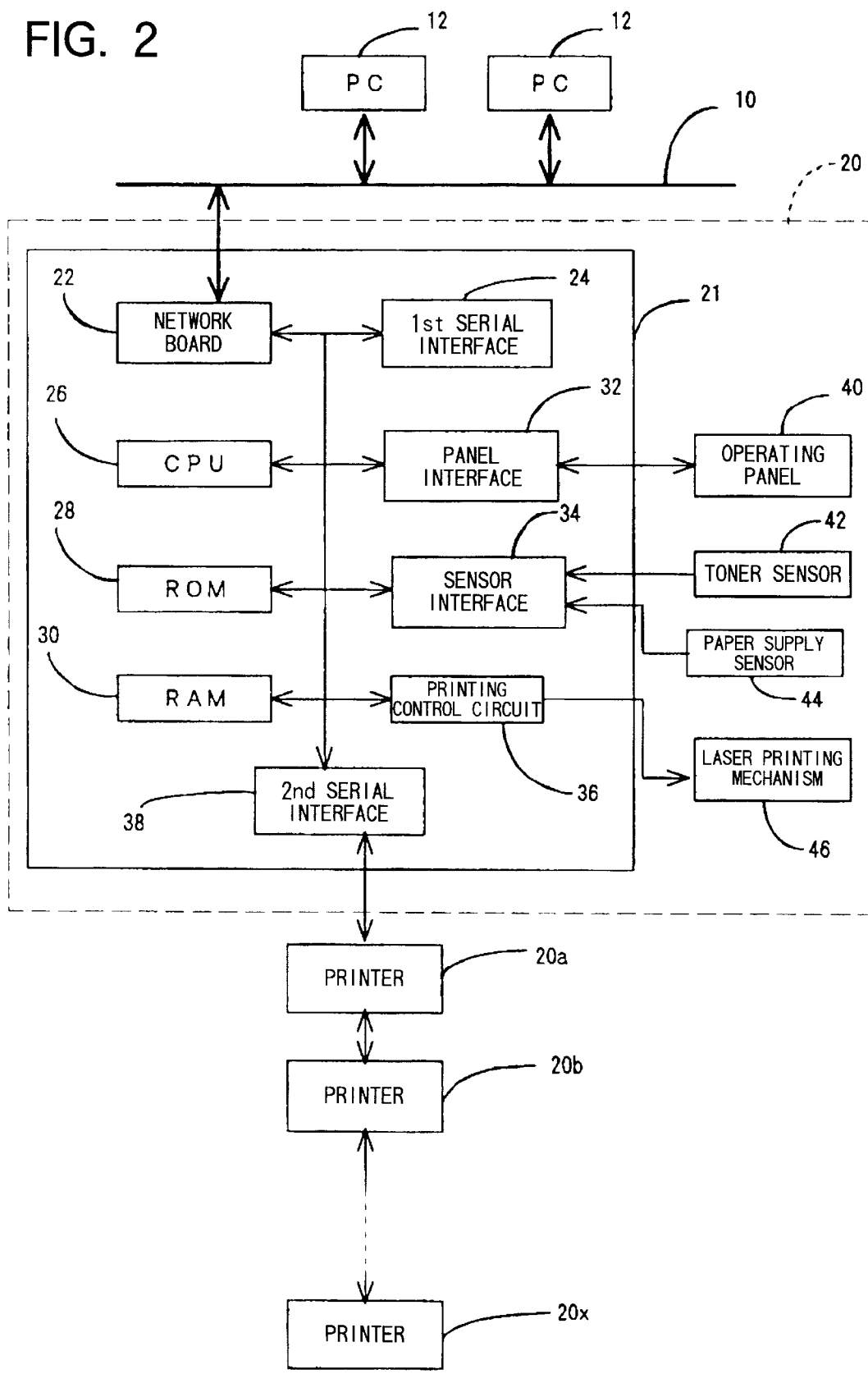
FIG. 2 is a block diagram showing the configuration of FIG. 1.

As shown in FIGS. 1 and 2, a LAN system includes a LAN circuit 10 and a plurality of personal computers (PC) 12 connected there to. The plurality of PCs are mutually connected to one another. A plurality of printers 20–20x is consecutively numbered and connected to one another in series or in cascade such that a second printer 20a is connected to a first printer 20, and a third printer 20b is connected to the second printer 20a and so on until a last printer 20x. The first printer 20 is also connected to the LAN circuit 10.

It should be noted that the PC 12 is termed to be provided upstream from the first printer 20. In other wards, the first printer is provided downstream from the PC 12. Likewise, the first printer 20 is provided upstream from the second printer 20a, and the second printer 20a downstream from the first printer 20. The last printer 20x is provided in the most downstream in the series.

As shown in FIG. 2, the first printer 20 includes a control device 21 for managing various control processes of the printer 20. The control device 21 includes a network board 22, a first serial interface 24, a CPU 26, a ROM 28, a RAM 30, a panel interface 32, a sensor interface 34, a printing mechanism control circuit 36, and a second serial interface 38. All of these components are connected via bus lines.

The network board 22, the first serial interface 24, and the second serial interface 38 perform communication functions as well known in the art. The network board 22 is detachable from the first printer 20 and transmits and receives various data according to a protocol of the LAN system as described later.

The CPU 26, ROM 28, and RAM 30 are also well known in the art, and therefore, descriptions of those will be omitted. The ROM 28 stores operating programs for the CPU 26, including programs for monitoring and for transmitting error signals.

An operating panel 40 is mounted on an external surface of the first printer 20 and is connected to the panel interface 32. Control signals inputted to the operating panel 40 is transmitted to the CPU 26 via the panel interface 32.

A laser printing mechanism 46 is connected to the printing mechanism control circuit 36. Although not shown in the drawings, the laser printing mechanism 46 includes a photosensitive drum, a charging unit, a laser irradiating mechanism, a paper cassette, a paper feed roller, a transfer roller, a developing roller, a cleaning roller, a motor, a fixing heater, and a toner case. The charging device charges the photosensitive drum. The laser irradiating mechanism applies laser light to the photosensitive drum. A stuck of paper sheets are stored in the paper cassette, and the toner case stores toner. The rollers are rotated by the motor. Based on commands from the CPU 26 and printing data, for example, stored temporarily in the RAM 30, the printing mechanism control circuit 36 controls these component of the laser printing mechanism 46 and executes a printing operation, that is, feeding a paper sheet from the paper cassette, printing an image with toner on the paper sheet, and discharging the paper sheet.

Sensors such as a toner sensor 42 and a paper supply sensor 44 are connected to the sensor interface 34. The toner sensor 42 detects a remaining level of toner in the toner case, and the paper supply sensor 44 detects a remaining amount of paper sheet in the paper cassette. The CPU 26 receives signals from these sensors via the sensor interface 34.

The printers 20a–20x have the same configuration as the first printer 20, except the former are not provided with network board 22. These printers 20a–20x are connected in series such that the second serial interface 38 of the first printer 20 is connected via a cable to a first serial interface of the second printer 20a, and a second serial interface of the second printer 20a is connected via a cable to a first serial interface of the third printer 20b, and so on (not shown in the drawings).

Next, operations of the printers 20–20x will be described with reference to a flowchart in FIG. 3. Since the operations of each of the printers 20–20x are basically the same, only the operations of the first printer 20 will be described in detail.

Figure 3:
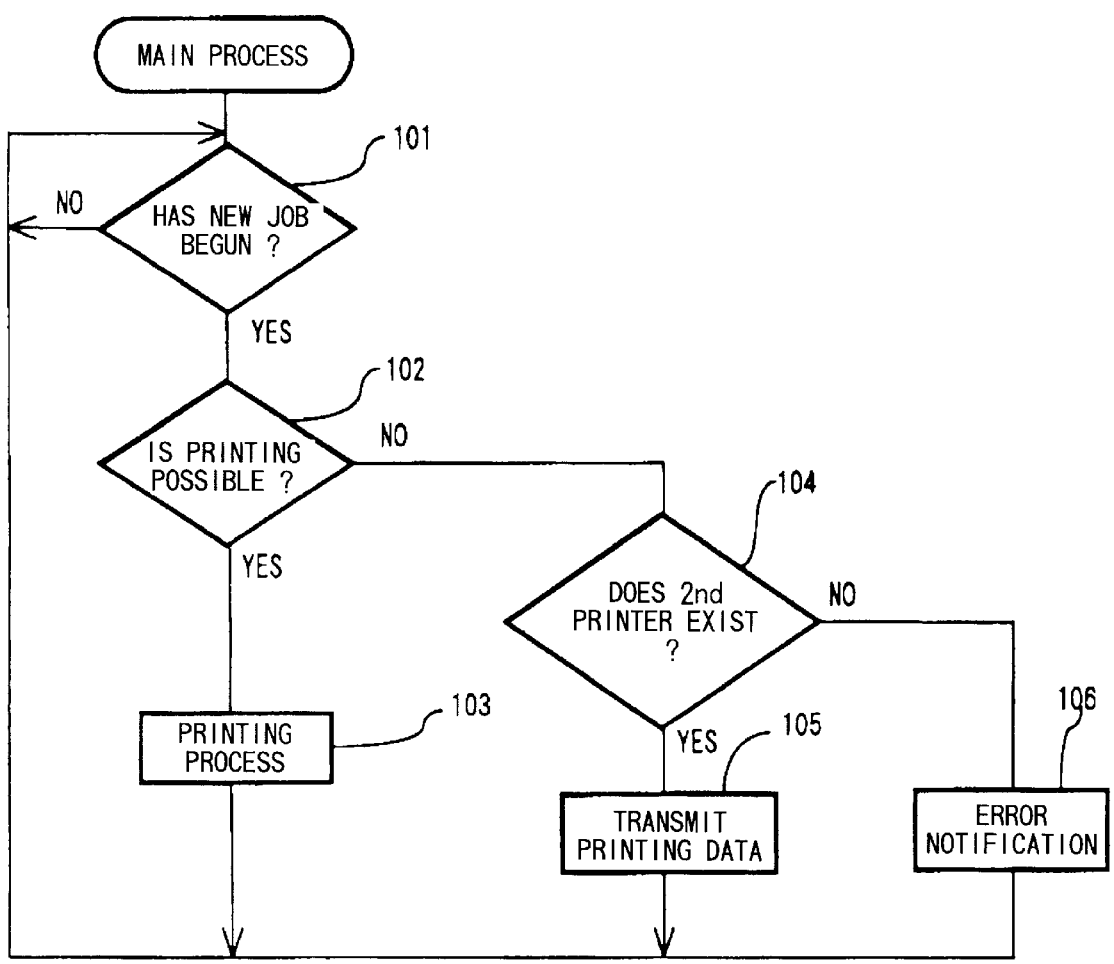
FIG. 3 is a flowchart representing a main process executed in a printing device according to the embodiment of the present invention.

When the first printer 20 is activated, the CPU 26 begins a main process shown in FIG. 3. First, the CPU 26 determines in 101 whether or not the network board 22 has received new printing data, that is, whether or not a new printing job has begun. The printing data is transmitted from, for example, the PC 12 via the LAN circuit 10. If so (YES:S101), the CPU 26 determines in S102 whether or not the printer 20 is in an available condition for printing. This determination is made based on signals transmitted from the toner sensor 42 and paper supply sensor 44 via the sensor interface 34. If so (YES:S102), the printing data is temporarily stored in the RAM 30 and then, transmitted to the printing mechanism control circuit 36. The laser printing mechanism performs the printing operation in S103.

If the first printer 20 is incapable of printing due to being out of paper or the like (NO:S102),then the CPU 26 determines in S104 whether or not the second printer 20a is connected to the printer 20. More specifically, the CPU 36 transmits a signal via the second serial interface 38. If the second printer 20a is connected, the CPU 26 receives a response from the printer 20a. On the other hand, if the second printer 20a is not connected, the CPU 26 does not receive any response. That is, the CPU 26 determines in S104 whether or not a response from the second printer 20a is received. If so (YES:S104), the printing data is transmitted in S105 to the printer 20a via the second serial interface 38. If not (NO:S104), an error signal is transmitted in S106 to the PC 12 via the network board 22.

When the printer 20a has received the printing data in S105, the process described above is repeated for the printer 20a. It should be noted, in this case, however, that the first serial interface rather than a network board receives the printing data. If the printer 20a is in an available condition for printing (YES:S102), then the printer 20a starts printing in S103. If not (NO:S102), then the CPU 26 determines in S104 whether or not the third printer 20b is connected. If so (YES:S104), the printing data is transmitted to the printer 20b in S105, and if not (NO:S104), an error signal is sent to the printer 20 in S106. The same process is executed for all printers downstream.

As described above, if any printer which has received printing data is in the available condition for printing, the printer prints the printing data. However, even if the printer cannot print the printing data for any reason, the printing data is transmitted to a next printer downstream. Therefore, if at least one of the printers 20–20x is available, the printing data can be printed. In this way, overall printing work will not be backed up.

Next, a query process and an answering process will be described while referring to flowcharts in FIG. 4 and FIG. 5, respectively. These processes are executed while the printers 20–20x are in an idle state, that is, while not performing data transmissions, data receptions, or printing operations. With these processes, a printer upstream verifies whether or not a printer downstream is in the available condition, and the printer downstream notifies the printer upstream of its condition.

In the query process, a CPU of each printer 20–20x transmits in S201 a query signal to a printer downstream. If a response indicating that the printer downstream is capable of printing (YES:S202), then data indicating printing is possible (printing possible) is stored in the RAM 30 in S203. On the other hand, if a response indicating that the printer downstream is not capable of printing (printing not possible) is received, or if no response is perceived (NO:S202), then the CPU 26 determines in S204 whether or not the present printer, that is, the printer in which the CPU 26 is provided, is capable of printing. If so (YES:S204), the process proceeds to S203. On the other hand, if not (NO:S204), then data indicating printing is not possible (printing not possible) is stored in the RAM 30 in S205.

In the answering process, when a CPU of one of the printers 20–20x has received in S301 a query signal from an printer upstream, the data stored in the RAM 30 in either S203 (printing possible) or S205 (printing not possible) is transmitted in S302 to the printer upstream.

As described above, each printer 20–20x notifies a respective printer upstream that printing is not possible only when both the printer itself and all printer downstream cannot perform printing. In this way, a printer upstream or the PC 12 can accurately recognize whether printing data can be printed by a printer downstream. This prevents transmitting unnecessarily printing data to a printer downstream when the printing data cannot be printed by the printer downstream either.

Figure 4:
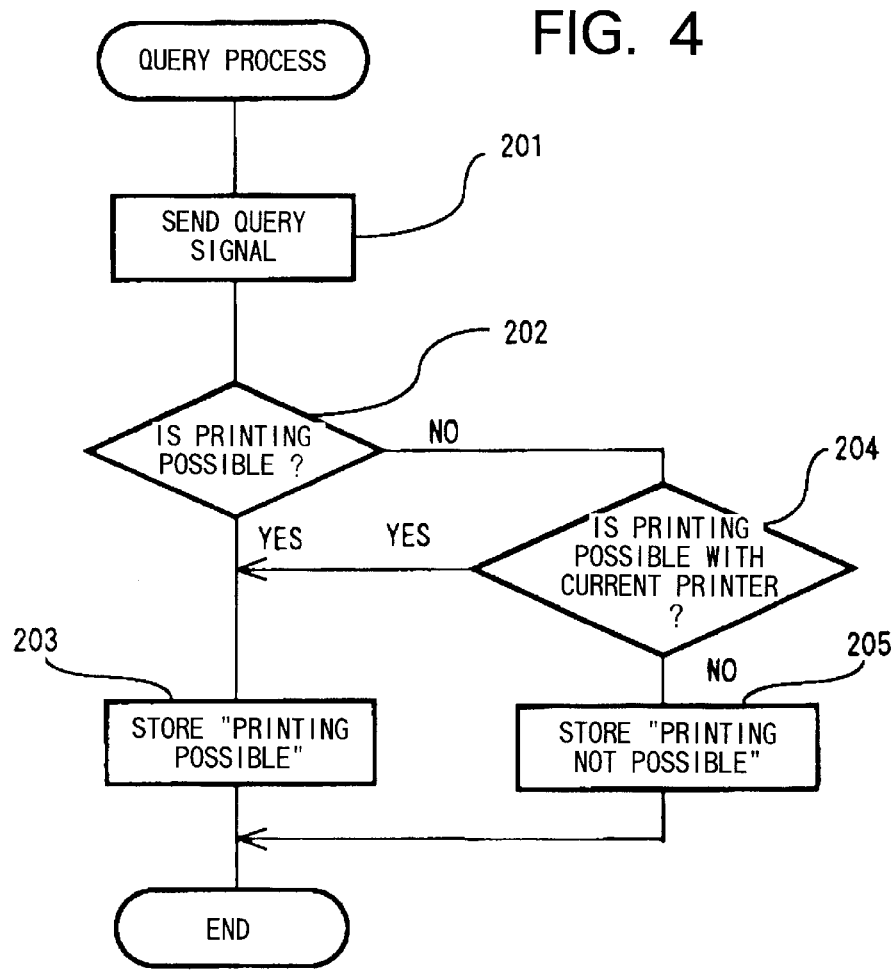
FIG. 4 is a flowchart representing a query process.
Figure 5:
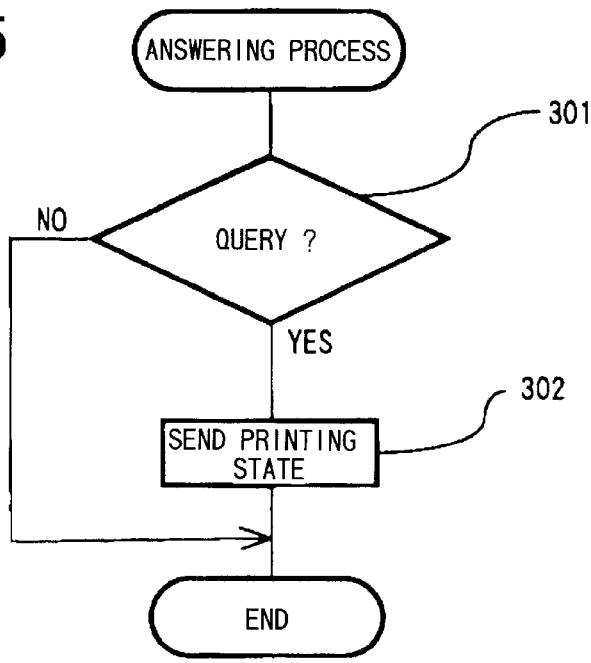
FIG. 5 is a flowchart representing a answering process.

The query process of FIG. 4 can be executed as the connection verification process for S104 of FIG. 3. Also the answering process of FIG. 5 can be executed as a response to this connection verification process.

Figure 6:
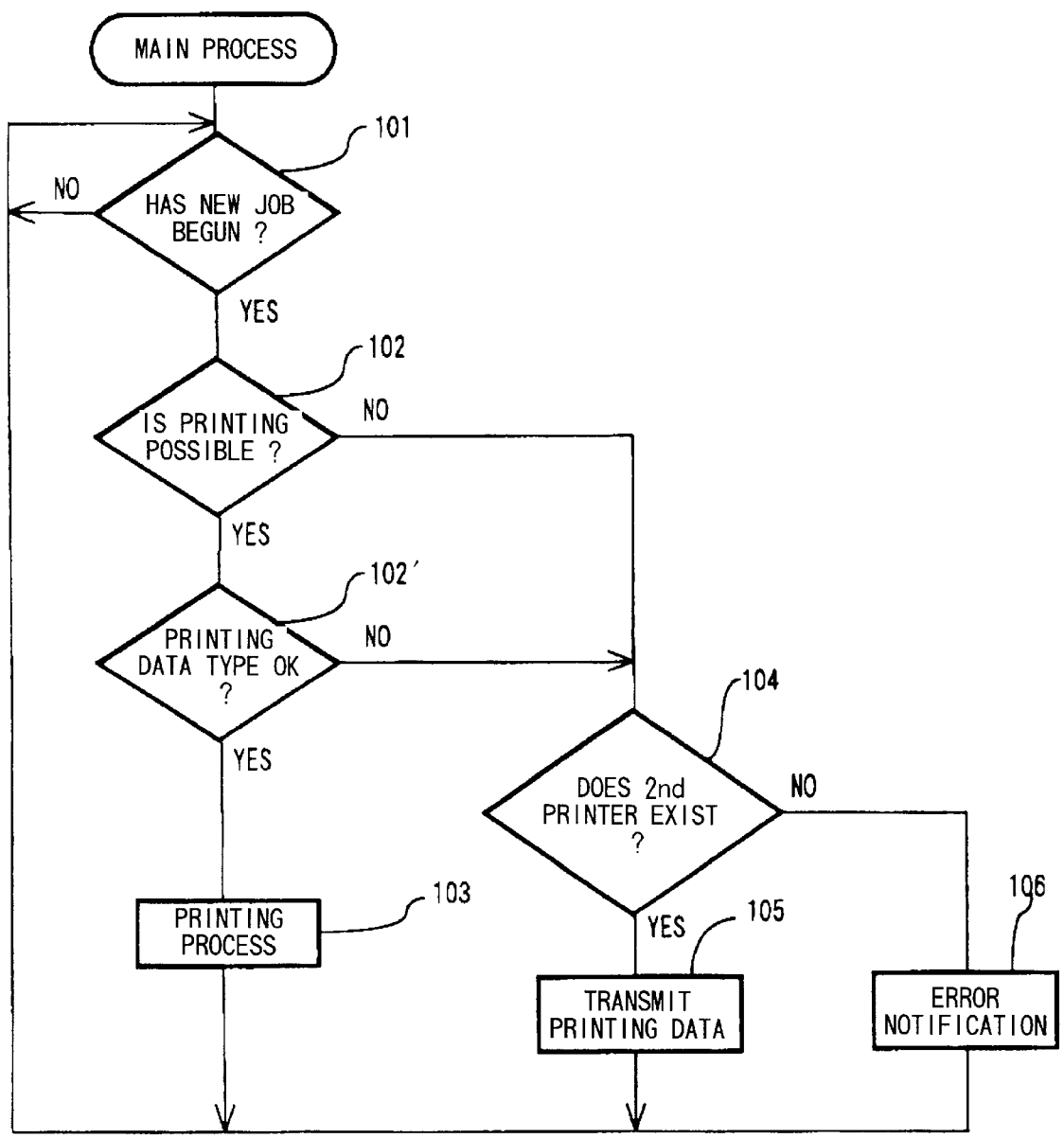
FIG. 6 is a flowchart representing a main process according to a modified embodiment of the present invention.

Considering that some printing devices might not suitable for printing certain types of printing data such as single-color printing data and multi-color printing data, the main process can include an additional step to determine whether or not the printer 20 is suitable for printing received printing data. More specifically, as show in FIG. 6, when the laser printing mechanism 46 is in the available condition (YES:S102), the CPU 26 further determines in S102' whether or not the printer 20 is suitable for printing current printing data. If so (YES:S102'), the program proceeds to S103 to print the printing data. On the other hand, if not (NO:S102'), the program proceeds to S104.

In this way, even when a printer designed, for example, to print single-color data has received color printing data, the printer forwards the data downstream. If any one of printers downstream is designed for printing color data, the printing data can be printed. In this way, a number of data types capable of being processed is increased. In other words, a microcomputer located upstream in a LAN system does not need to determine whether or not a transfer destination is capable of printing a specific type of data such as color printing data.

While the invention has been described in detail with reference to specific embodiments thereof, it would be apparent to those skilled in the art that various changes and modifications may be made therein without departing from the spirit of the invention, the scope of which is defined by the attached claims.

For example, in the embodiment described above, the network board 22 is provided inside the printer 20. However, the network board 22 can be provided as an external component by being placed between the first serial interface 24 and the LAN circuit 10.

The printer 20 can be connected to the LAN circuit via a host computer. Also, the printer 20 does not need to connect to the LAN circuit, but can be provided in the PC 12 as an internal component.

Further, the present invention can be applied to a facsimile device.

The present invention also can be adapted to a stand-alone printing system.

What is claimed is:

1. A local area network comprising:
a LAN circuit;
a printing data generating device that generates printing data and is connected to the LAN circuit;
a plurality of printing devices connected in cascade and being consecutively numbered from 1 to n where n is an integer, the LAN circuit connecting the printing data generating device to the first printing device of the plurality of printing devices, wherein each of the plurality of printing devices comprises:
first communication means for receiving the printing data;
memory means for storing the printing data received by the first communication means;
second communication means for outputting the printing data stored in the memory means;
printing means for printing images based on the printing data received by the first communication means; and
determining means for determining a state of the printing means whether or not the printing means is in an available condition for printing,
wherein the first communication means of an (i+1)th printing device is connected to and communicates with the second communication means of an i-th printing device, and the first communication means of the first printing device is connected to and communicates with the printing data generating device, and wherein if the printing means of the i-th printing device is unavailable, the second communication means of the i-th printing device transmits the printing data to the first communication means of the (i+1)th printing device, i representing any one of integers from 1 to n.

2. The local area network of claim 1, wherein the first communication means of the first printing device outputs an error signal to the printing data generating devices when the printing means of all of the plurality of printing devices are unavailable.

3. The local area network of claim 1, wherein the first communication means of the (i+1)th printing device outputs an error signal to the second communication means of the i-th printing device when the printing means of all of the (i+1)th to n-th printing devices are unavailable.

4. The local area network of claim 3, wherein the second communication means of the i-th printing device does not transmits the printing data to the first communication means of the (i+1)th printing device when the second communication means of the i-th printing device receives an error signal.

5. The local area network of claim 1, wherein the i-th printing device further comprises connection detecting means for detecting whether or not the second communication means of the i-th printing device is connected to the first communication means of the (i+1)th printing device, and if the second communication means of the i-th printing device is not connected to the first communication means of the (i+1)th printing device, the second communication means of the i-th printing device does not transmit the printing data to the first communication means of the (i+1) printing device.

6. The local area network of claim 5, wherein:
the second communication means of the i-th printing device transmits a query signal to the first communication means of the (i+1)th printing device;
the first communication means of the (i+1)th printing device transmits an answering signal to the second communication means of the i-th printing device upon receiving the query signal.

7. The local area network of claim 6, wherein when the second communication means of the i-th printing device receives the answering signal after transmitting the query signal, the connection detection means of the i-th printing device determines that the second communication means o the -th printing device is connected to the first communication means of the (i+1)th printing device.

8. The local area network of claim 6, wherein upon receiving the query signal, the first communication means of the (i+1)th printing device transmits the answering signal indicating whether or not at least any one of the printing means of the (i+1)th to n-th printing devices is available.

9. The local area network of claim 1, wherein the i-th printing device further comprises data type identifying means for determining, when the first communication means of the i-th printing device receives printing data, whether or not the printing means is suitable for the printing data to print, and when the printing means is not suitable for the printing data, the second communication means of the i-th printing device transmits the printing data to the first communication means of the (i+1)th printing device.

10. The local area network of claim 9, wherein when the printing means of all of the plurality of printing devices is not suitable for the printing data, the first communication means of the first printing device outputs an error signal to the printing data generating devices.

11. The local area network of claim 9, wherein when the printing means of all of the printing means of the (i+1)th to n-th printing devices is not suitable for the printing data, the first communication means of the (i+1)th printing device outputs an error signal to the second communication means of the i-th printing device.

12. The local area network of claim 9, wherein the data type identifying means determines whether or not the printing means is suitable for the printing data based on a color type for which the printing means is designed and on a color-type of images for which the printing data is generated.

13. A printing system comprising:
   a LAN circuit;
   a printing data generating device that generates printing data and is connected to the LAN circuit;
   a plurality of printing devices connected in cascade and being consecutively numbered from 1 to n where n is an integer, the LAN circuit connecting the printing data generating device to the first printing device of the plurality of printing devices, wherein each of the plurality of printing devices comprises:
      first communication means for receiving the printing data;
      memory means for storing the printing data received by the first communication means;
      second communication means for outputting the printing data stored in the memory means;
      printing means for printing images based on the printing data received by the first communication means; and
      determining means for determining a state of the printing means whether or not the printing means is in an available condition for printing,
   wherein the first communication means of an (i+1)th printing device is connected to and communicates with the second communication means of an i-th printing device, and the first communication means of the first printing device is connected to and communicates with the printing data generating device, and wherein if the printing means of the i-th printing device is unavailable, the second communication means of the i-th printing device transmits the printing data to the first communication means of an (i+1)th printing device, i representing any one of integers from 1 to n.

14. The printing system of claim 13, wherein the first communication means of the first printing device outputs an error signal to the printing data generating devices when the printing means of all of the plurality of printing devices are unavailable.

15. The printing system of claim 13, wherein the first communication means of the (i+1)th printing device outputs an error signal to the second communication means of the i-th printing device when the printing means of all of the (i+1)th to n-th printing devices are unavailable.

16. The printing system of claim 15, wherein the second communication means of the i-th printing device does not transmits the printing data to the first communication means of the (i+1)th printing device when the second communication means of the i-th printing device receives an error signal.

17. The printing system of claim 13, wherein the i-th printing device further comprises connection detecting means for detecting whether or not the second communication means of the i-th printing device is connected to the first communication means of the (i+1)th printing device, and if the second communication means of the i-th printing device is not connected to the first communication means of the (i+1)th printing device, the second communication means of the i-th printing device does not transmit the printing data to the first communication means of the (i+1) printing device.

18. The printing system of claim 17, wherein:
   the second communication means of the i-th printing device transmits a query signal to the first communication means of the (i+1)th printing device;
   the first communication means of the (i+1)th printing device transmits an answering signal to the second communication means of the i-th printing device upon receiving the query signal.

19. The printing system of claim 18, wherein when the second communication means of the i-th printing device receives the answering signal after transmitting the query signal, the connection detection means of the i-th printing device determines that the second communication means o the -th printing device is connected to the first communication means of the (i+1)th printing device.

20. The printing system of claim 18, wherein upon receiving the query signal, the first communication means of the (i+1)th printing device transmits the answering signal indicating whether or not at least any one of the printing means of the (i+1)th to n-th printing devices is available.

21. The printing system of claim 13, wherein the i-th printing device further comprises data type identifying means for determining, when the first communication means of the i-th printing device receives printing data, whether or not the printing means is suitable for the printing data to print, and when the printing means is not suitable for the printing data, the second communication means of the i-th printing device transmits the printing data to the first communication means of the (i+1)th printing device.

22. The printing system of claim 21, wherein when the printing means of all of the plurality of printing devices is not suitable for the printing data, the first communication means of the first printing device outputs an error signal to the printing data generating devices.

23. The printing system of claim 21, wherein when the printing means of all of the printing means of the (i+1)th to n-th printing devices is not suitable for the printing data, the first communication means of the (i+1)th printing device outputs an error signal to the second communication means of the i-th printing device.

24. The printing system of claim 21, wherein the data type identifying means determines whether or not the printing means is suitable for the printing data based on a color type for which the printing means is designed and on a color-type of images for which the printing data is generated.

* * * * *